No. 662,601. Patented Nov. 27, 1900.
A. W. PEARSALL.
CARRIER FOR PNEUMATIC DESPATCH TUBE APPARATUS.
(Application filed May 20, 1898.)
(No Model.)
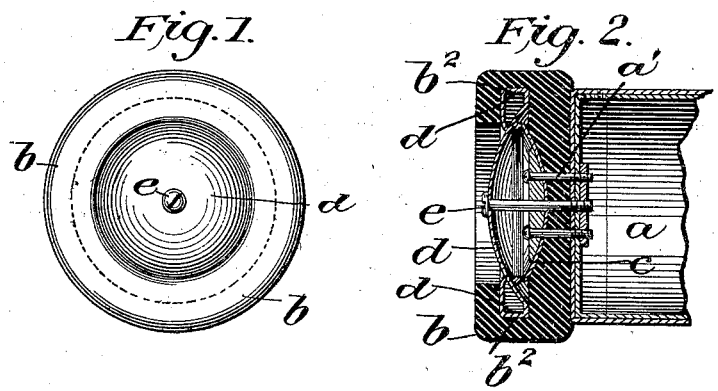
Witnesses:
Grant Burroughs
G. J. Ritchie
Inventor:
Albert W. Pearsall
by
Gilman & Rusk
attys

UNITED STATES PATENT OFFICE.

ALBERT W. PEARSALL, OF NEW YORK, N. Y., ASSIGNOR TO THE LAMSON CONSOLIDATED STORE SERVICE COMPANY, OF NEWARK, NEW JERSEY.

CARRIER FOR PNEUMATIC-DESPATCH-TUBE APPARATUS.

SPECIFICATION forming part of Letters Patent No. 662,601, dated November 27, 1900.

Application filed May 20, 1898. Serial No. 681,219. (No model.)

*To all whom it may concern:*

Be it known that I, ALBERT W. PEARSALL, of New York, in the county of New York and State of New York, have invented certain new and useful Improvements in Carriers for Pneumatic-Despatch-Tube Apparatus, of which the following is a specification.

My invention relates to new and useful improvements in carriers for pneumatic-despatch-tube apparatus; and the object is to provide a carrier with a buffer-head, which is provided with means for adjusting the same to the internal diameter of the tube, and thereby preventing escape of the propelling force past the carrier while the same is in transit. In the carriers at present in use the felt heads on the ends of the carriers, owing to continuous use, soon become too small to properly fill the tube, and owing to the fact that there is considerable leakage of the propelling force past the carriers they become lodged in the tube, and thereby block the same.

The carrier to which my improved buffer-head is shown as applied is of the character shown in the patent to Miller, No. 429,143, dated June 3, 1890, and, as shown in said patent, consists of two cylinders provided with an opening which by turning the cylinders upon one another are brought into alinement to receive the cash or other matter, and by turning the same the opening is closed to hold the cash or memoranda being transmitted.

My invention consists of certain novel features hereinafter described, and particularly pointed out in the claims.

In the accompanying drawings, which illustrate a construction embodying my invention, Figure 1 is an end view of one of the buffer-heads. Fig. 2 is a cross-sectional view through one of the heads and a portion of the carrier.

Like letters of reference refer to like parts throughout both views.

$a$ represents a carrier provided with a buffer-head on each end of the carrier, one of which, $b$, as shown in the drawings, consists of a composition of rubber and felt compressed to the form shown in the drawings. These heads are hollowed, as shown, and the same are secured to the carrier by bolts $a'$, and each head is provided with a cavity $b'$, in which is located the metallic cone-disk $c$, also secured in place by bolts $a'$. Located in said cavity $b'$ and in the recess $b^2$ of the head is another metallic disk $d$. The head $b$ is adjusted by the screw-bolt $e$, which secures the disks $c$ and $d$ together and expands the head $b$ to fit the internal diameter of the tube through which the carriers are to be despatched. As the head $b$ becomes worn from use it is expanded to meet the internal diameter of the tube by screwing up the screw-bolt $e$ from time to time, and by this arrangement the head is kept sufficiently expanded to fill the diameter of the tube, and thus prevent the escape of air past the carrier, so that the full effect of the propelling force is obtained.

I do not limit myself to the arrangement and construction shown, as the same may be varied without departing from the spirit of my invention.

Having thus ascertained the nature of my invention and set forth a construction embodying the same, what I claim as new, and desire to secure by Letters Patent of the United States, is—

1. In a carrier for pneumatic-despatch-tube apparatus, a buffer-head provided with a cavity opening through the side farthest from the body of the carrier, a flexible spreader located within said cavity, and means for adjusting the tension of said spreader.

2. In a carrier for pneumatic-despatch-tube apparatus, a buffer-head provided with a cavity opening through the side farthest from the body of the carrier, means for securing said buffer-head to the body of the carrier, a concave metallic disk located in said cavity, and means for compressing said disk to increase its diameter and thereby spreading said buffer-head.

3. In a carrier for pneumatic-despatch-tube apparatus, a buffer-head provided with a cavity, means for securing said buffer-head to the body of the carrier, a flexible metallic spreader consisting of two concave metallic disks located in said cavity bearing on each other, and means on the carrier for drawing said disks together and thereby spreading the head to the internal diameter of the tube.

In testimony whereof I have signed my name to this specification, in the presence of two subscribing witnesses, this 20th day of April, A. D. 1898.

ALBERT W. PEARSALL.

Witnesses:
 J. I. RYAN,
 G. E. SCRAFFORD.